HECTOR R. BARRIOS
JOSEPH S. MOLLETTA
ROBERT C. NORDBERG
INVENTORS

BY Fraser and Bogucki

ATTORNEYS

HECTOR R. BARRIOS
JOSEPH S. MOLLETTA
ROBERT C. NORDBERG
INVENTORS

BY Fraser and Bogucki

ATTORNEYS

July 14, 1964
H. R. BARRIOS ETAL
3,140,968
METHOD AND APPARATUS FOR HELICALLY WINDING
STRIPS ON EDGE UNDER PRESSURE
Filed Jan. 11, 1960
5 Sheets-Sheet 3
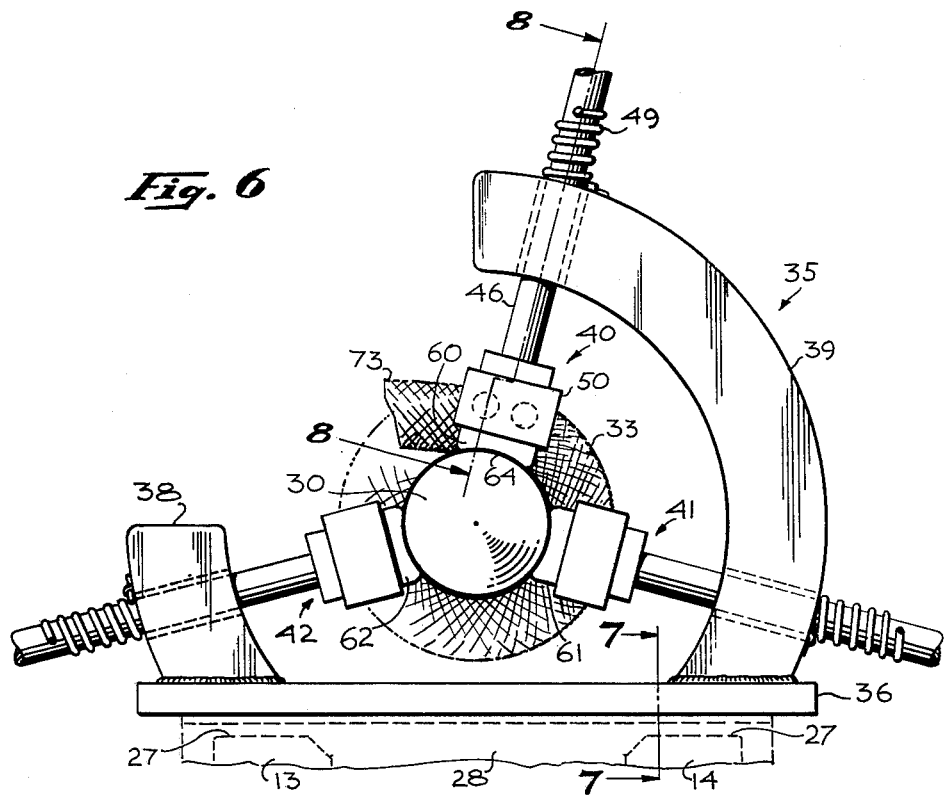
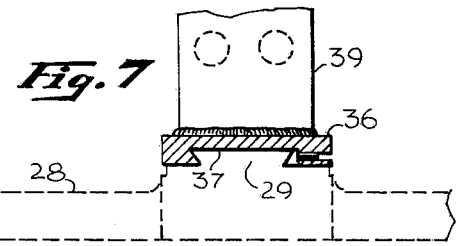
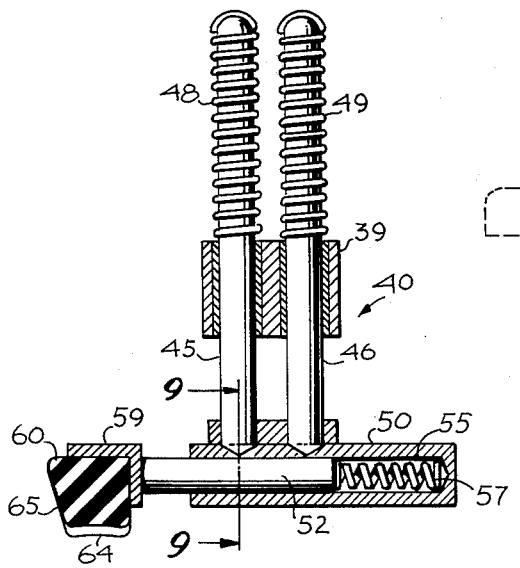
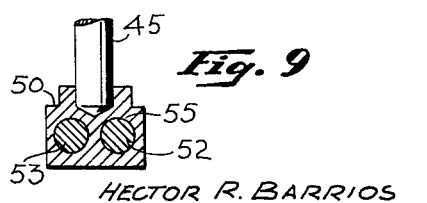
HECTOR R. BARRIOS
JOSEPH S. MOLLETTA
ROBERT C. NORDBERG
INVENTORS
BY Fraser and Bogucki
ATTORNEYS

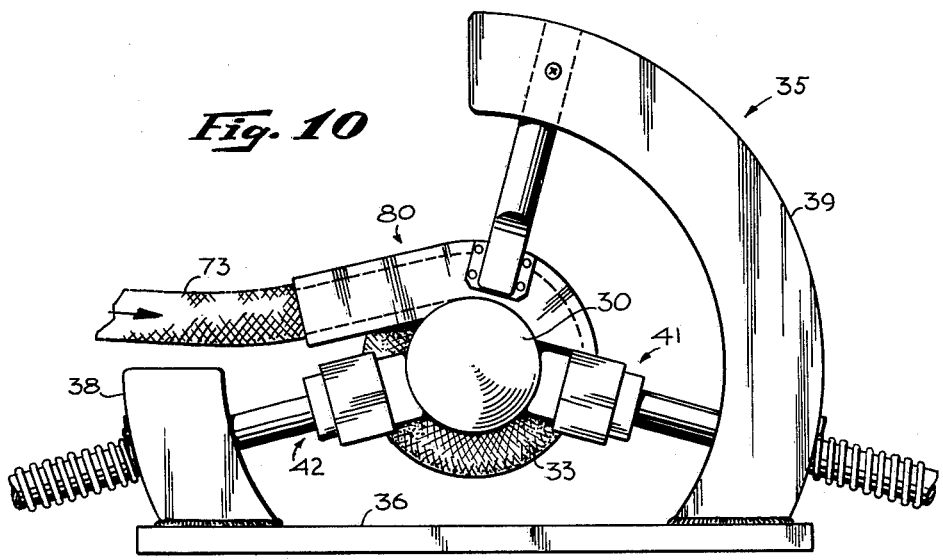
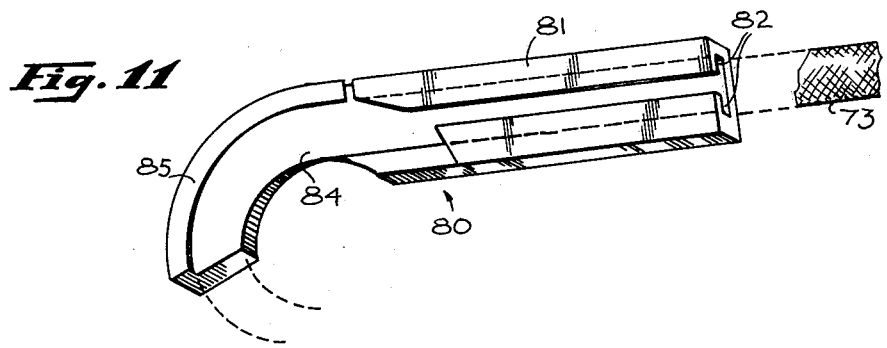
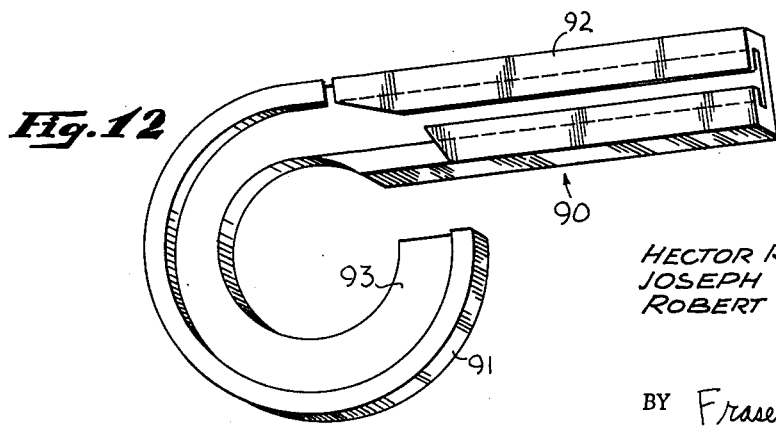
HECTOR R. BARRIOS
JOSEPH S. MOLLETTA
ROBERT C. NORDBERG
INVENTORS
BY Fraser and Bogucki
ATTORNEYS July 14, 1964 H. R. BARRIOS ETAL 3,140,968
METHOD AND APPARATUS FOR HELICALLY WINDING
STRIPS ON EDGE UNDER PRESSURE
Filed Jan. 11, 1960 5 Sheets-Sheet 5

HECTOR R. BARRIOS
JOSEPH S. MOLLETTA
ROBERT C. NORDBERG
INVENTORS

BY Fraser and Bogucki

ATTORNEYS

United States Patent Office 3,140,968
Patented July 14, 1964

3,140,968
METHOD AND APPARATUS FOR HELICALLY WINDING STRIPS ON EDGE UNDER PRESSURE
Hector R. Barrios, La Mirada, Joseph S. Molletta, Downey, and Robert C. Nordberg, La Mirada, Calif., assignors to H. I. Thompson Fiber Glass Company, Los Angeles, Calif.
Filed Jan. 11, 1960, Ser. No. 1,554
13 Claims. (Cl. 156—192)

This invention relates to the fabrication of bodies for high temperature environments, and particulary to machines and methods for fabricating high temperature fiber reinforced structures in which the fibers have selected internal dispositions.

Materials which are exposed to high temperature gases are subject to ablation and erosion effects on those surfaces which are contacted by the gases. Where these effects are or can be appreciable, some measure of control is necessary over the rate at which the effects occur. Because extremely high temperature environments are being increasingly encountered or used in modern technology, materials which have high resistance to ablation in combination with other desirable structural characteristics are being increasingly sought.

It has been found that glass fiber-reinforced resin impregnated bodies can be fabricated which have the desired high temperature stability and resistance to ablation. Vitreous silica fibers are particularly suitable for this purpose. Vitreous silica fibers of sufficiently high silica content, from 96% to 99% or more of silica on a dehydrated basis, having a melting point in the range of 3100° F. Furthermore, fibers of this composition have extremely high viscosity upon melting, so that they do not flow rapidly. The silica fibers vaporize after melting and thus tend to cool the heated surface.

The use of continuous silica fibers for the reinforcements can add appreciably to the mechanical and thermal characteristics of a fabricated structure. A particularly significant development in the use of silica fibers employ the fibers in selected orientations relative to the surface of the structure which is subject to ablation. Usually, the structures are built up in laminated fashion in the form of layers. When the laminations lie parallel or substantially parallel to the direction of relative movement of the contacting gases the laminations tend to peel off and the erosion due to ablation tends to peel off and the erosion due to ablation is very rapid. Such difficulties are minimized when the direction of lamination of the layers is at an angle to the direction of the gases, and especially when the layers are are tapered back in the direction of flow of the gases. Further material advantages have been shown to be derived when each of the fibers in the laminations is at an oblique angle to the surface which is subject to ablation. Such an alignment of the fibers anchors each fiber in a cold portion of the structure, so that only the ends of the fibers protrude into the immediate vicinity of the hot gases. This disposition of the fibers also insures better realization of the optimum structural characteristics of the individual laminations.

High temperature bodies which are fabricated in this way, with laminations which are tapered with respect to the direction of flow of the eroding gases, and which have fibers disposed obliquely with respect to the surface being eroded, have been termed "end grain" oriented structures. It will readily be evident that such orientation provides better resistance to and control of the ablation characteristic, and a superior final product.

Structures which have some of the features of end grain orientation have previously been provided by using silica cloth layers cut into different special configurations. As one example, rings may be cut out of a bolt of cloth and piled one on top of the other until enough material is present for a cylinder or other structure. This technique is not only wasteful of the inner disc of cloth material, and relatively time consuming, but also lacks the desired directional disposition of the individual fibers. In another technique, strips of cloth have been provided by lengthwise cuts along a bolt of material, and the strips then have been distorted into the form desired, with the outer edges of the strips being notched to permit the strips to stretch sufficiently. This technique requires considerable amounts of material, is also relatively time consuming, and has some of the fibers parallel to the surface subject to erosion. Neither technique is satisfactory where the desired structure has a configuration of non-uniform cross section, such as a truncated cone.

An important consideration which underlies the fabrication of such structures is the relatively high cost of the materials involved. In processing silica fiber cloth, mats or other forms, to the required degree of silica purity and strength, the materials and time consumed contribute to a high cost per unit area. Any technique which requires the wasteage of material is therefore to be avoided.

In addition to the matter of cost, the density of the structure which is finally fabricated is extremely important. There is a close relation between the density and the resistance of the structure to ablation. Consequently, it is desirable to be able both to control density and to achieve maximum density. Considerable difficulty has been experienced in this regard, due to the fact that the cloth or mat which is used as basic material can vary widely in thickness. The material is resin impregnated, but it has been found extremely difficult to maintain thickness uniform even within the same bolt. These variations have often resulted in a fabricated structure which has varied radically in density throughout its length.

At times, for example, resin impregnated cloth has a tacky or sticky surface which makes it possible to relay on an adhesion between adjacent layers during the assembly of the structure. At other times, however, the surface tackiness of the cloth is almost entirely absent. This factor apparently cannot be satisfactorily controlled, so that often the adjacent layers of cloth will tend to slip apart. Such slippage affects either the configuration or the density of the structure and materially increases the number of defective articles produced.

These difficulties are compounded when precise control is sought over the direction of the laminations in the structure. Often, it is desirable to closely control the angle of the laminations relative to the direction of the hot gases over the entire length of the fabricated structure. The variations in the cloth or other materials and in the fabricating techniques which have heretofore been used have resulted in very high proportions of rejects when fabricating the parts.

Additionally, with some configurations the techniques heretofore used have simply not been able to provide structures of adequate density. In densifying a structure built up from a number of layers it is sometimes possible to use a compression technique after the final structure has been completed in rough form. Where high density is sought, however, this compression technique may not provide the desired degree of densification.

It is therefore an object of the present invention to provide an improved method of fabricating fiber reinforced solid walled structures in which the fibers have an end grain orientation.

A further object of the present invention is to provide improved machines for manufacturing high ablation resistant structures with minimum wasteage of material and high density.

Yet another object of the present invention is to provide improved methods of processing vitreous silica fiber cloths into solid structure form.

Still another object of the present invention is to provide an improved device for fabricating uniformly high density solid walled ablation resistant structures from silica fiber materials which are subject to some variations in thickness and tackiness.

A further object of the present invention is to provide methods for the rapid fabrication of high density ablation resistant high temperature structures.

A further object of the present invention is to provide improved machines for the rapid fabrication of structures from fiber cloth, in which structures the cloth is in the form of laminations at an angle to a selected surface of the structure, and in which the individual fibers within the laminations are disposed angularly with respect to the selected surface of the structure.

These and other objects of the invention may be achieved in accordance with the present invention by building up a solid walled structure with silica fiber segments formed by distortable tape which is cut on a bias. The segments are axially compressed in a manner such that a densified structure results which has both a selected direction of lamination and individual fiber dispositions.

In preferred machines and methods in accordance with the invention, an impregnated vitreous high silica content fiber cloth is employed. This cloth is cut on a bias into strips which are fed edgewise onto a rotating central form, such as a mandrel. The structure is built up by helically winding the strips about the central form, starting from a lay-up region. As the structure is built up, however, it is maintained in axial compression against the lay-up ring by pressure elements which move axially along the mandrel at a rate which is controlled with respect to the rotational speed of the mandrel. The strips are fed onto the mandrel from a guiding mechanism which also moves axially along the mandrel with the pressure elements. Structures which have a uniform partial densification are provided by this arrangement, independently of variations in cloth thickness and tackiness. Thereafter, the entire central form containing the wound structure can be removed and solidified subsequent to a final compression. After removal of the structure from the central form, it may be machined to a desired size and final shape with minimum wastage of material.

A better understanding of the invention may be had by reference to the following description, taken in conjunction with the accompanying drawings, in which:

FIG. 6 is an end view of a portion of the arrangement of FIG. 4, showing the disposition of pressure elements used therein;

FIG. 7 is a fragmentary sectional view of a portion of the arrangements of FIG. 6, taken along the line 7—7 of FIG. 6 and looking in the direction of the appended arrows, showing the manner in which the pressure element mounting structure may be coupled to the associated structure;

FIG. 8 is a fragmentary sectional view, taken along the line 8—8 of FIG. 6, of the arrangement of the pressure elements of FIG. 6;

FIG. 9 is a fragmentary sectional view, taken along the line 9—9 of FIG. 8, looking in the direction of the appended arrows, showing further details of the arrangement of the pressure elements;

FIG. 10 is a partial end view of an arrangement like that of FIG. 6, including a different arrangement of pressure and guide elements;

FIG. 11 is a perspective view showing details of the guide element of FIG. 10;

FIG. 12 is a perspective view of a different form of guide which may be employed in accordance with the invention;

Figure 1:
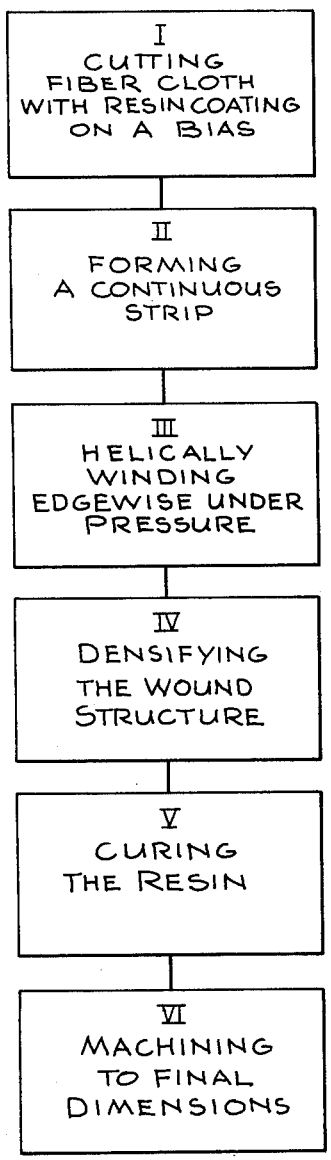
FIG. 1 is a block diagram representation of the principal steps involved in one method in accordance with the present invention.

The principal steps which may be followed in practicing a preferred method in accordance with the invention are shown in block diagram form in FIG. 1. The basic material which may be employed is a distortable fiber tape, the fibers of which are of high silica content, preferably above 96% silica on a dehydrated basis. While the fibers themselves range from submicron size to approximately 20 microns in diameter, the tape may be of the order of several hundredths of an inch in thickness.

The distortable fiber tape may be formed of mat material or consist of woven cloth. The felted mats have the advantage of being less costly, but the cloth is more widely employed and examples of the practice of the invention will principally be concerned with cloth. It will be recognized, however, that the principal feature is the use of a distortable tape whose individual fibers are largely end oriented at the edge of the tape. While high silica content fibers are preferred because of their excellent properties, certain other materials, such as nylon, may be employed for some applications.

Ordinarily the cloth is supplied by processors in bolt form, and it is preferred that the cloth be impregnated or coated with a resin coating. With phenolic resins, the coating is preferably in a partially cured, or B stage, condition. Epoxy resins or other coatings and other curing conditions may, however, be used. From these bolts it may be desired to fabricate heat resistant surfaces, such as rocket nozzles, nose cones and the like, having the general form of a surface of revolution having a hollow interior but relatively thick solid walls. What is particularly sought is to have the fibers in the final structure at a desired angle of inclination with respect to the relative movement of the gases adjacent the surface of the structure, and to employ continuous or long length fibers, each of which has an end grain orientation at the surface which is subject to ablation.

In methods in accordance with the present invention, bolts of the resin coated fiber cloth are first segmented (as set out in step I in FIG. 1) into individual strips which are cut on a bias with respect to the weave of the cloth. Preferably, this angular or biased cut relative to the weave is made on the diagonal, so that the fibers in the strips are at 45° angles to the direction of elongation of the strips. In the second principal step (II) preparatory to the fabrication of the structure the individual segments may be formed into an essentially continuous strip. A continuous strip may be formed by at least two layers each consisting of segments laid end to end, and all of which are cold pressed together to cause the surfaces of the layers to adhere to each other. A pressure of less than 800 p.s.i. has been found satisfactory for providing material adhesion without rupture or subsequent recovery where the resin coating is sufficiently high. By "continuous strip," however, it is meant to include loosely joined or merely overlapped successive segments as well as the firmly joined segments.

The continuous strip which is thus formed is then wound in the succeeding step (III) helically upon a central form. The strip is laid on edgewise, relative to the form, with flat sides of the strips being placed together. As the strip is wound upon the form, pressure is maintained on the turn which is being added to the structure to maintain the structure under axial compression relative to the central form. In a preferred method, this axial compression is maintained uniform along the length of the structure as it is built up, and the fully wound structure which results is partially densified and uniform throughout. Thereafter, in the succeeding step (IV) the wound structure, still on the central form, may be densified to a desired degree by being placed under pressure in an autoclave. Although the autoclave is preferred, other mechanical compression arrangements may also be employed. The density attained in the final product is of the order of one hundred pounds per cubic foot or more.

Once the structure has been densified to a sufficient degree, the structure may be solidified. With a partially cured phenolic resin coating the resin may be fully cured (step V in FIG. 1) until it is in the fully cured, C stage condition. Thereafter, the cured densified structure, upon removal from the central form, may be machined (step VI) to final desired inner and outer dimensions. The method thus generally described not only provides a rapid fabrication of the final structure, but also wastes very little cloth, provides desired density and has a very low reject rate.

Figure 3:
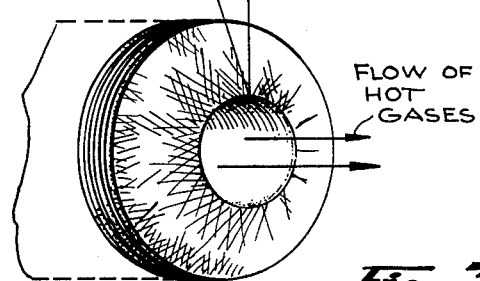
FIG. 3 is a perspective view, partially broken away, of a fragment of a fiber reinforced body fabricated in accordance with the present invention, showing the internal disposition of the fibers therein.

An example of the type of structure which may be provided by this method is illustrated in FIG. 3 in a perspective view, partially broken away, of a cylinder as used in a rocket nozzle or like application. Hot gases flow through the interior of the cylinder, and subject the interior surface to extremely high temperatures. The cylinder is built up of ring-type laminations of the selected fiber cloth. When each of the layers of cloth lies in a plane substantially normal to the direction of flow of the gases, the direction of lamination may be referred to as being a 90° lamination. In accordance with the application and the operating requirements, for a particular structure, the direction of lamination may also be inclined toward the direction of flow of the gases at an angle less than 90°. This inclination will be the same, in structures provided in accordance with the present invention, at all points around the periphery of the cylinder.

The disposition of the fibers making up an individual layer in the structure of FIG. 3 are also shown in simplified form. As may be seen therein, the individual fibers are disposed at a 45° angle relative to the hot inner surface of the cylinder, so that each fiber is of long length, essentially continuous, and is anchored in a cold region of the structure. It should be noted that this use of strips on a bias also has important advantages in handling and maintaining full strength for the structure. In being wound edgewise about the central form the strips which make up the distortable tape are required to stretch on the outer periphery with respect to their inner periphery. Because the strips are at 45° to the weave of the cloth, the cloth is not torn or weakened measurably by this stretching, so that good compaction and strength is maintained throughout the wall of the structure.

Figure 2:
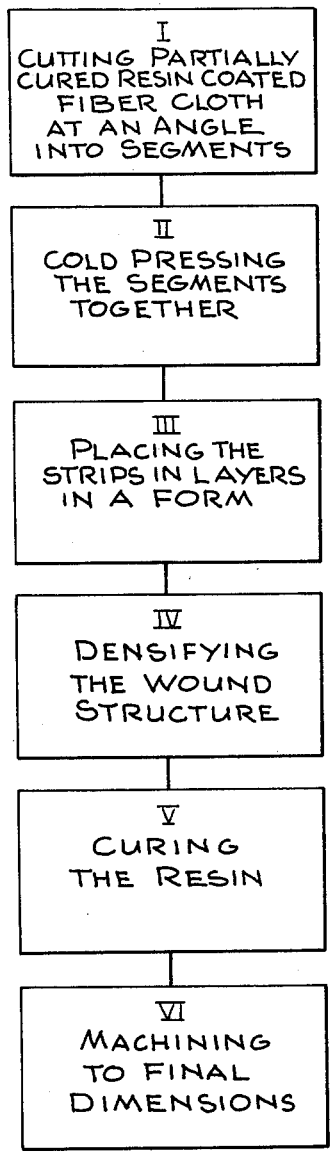
FIG. 2 is a block diagram representation of another method in accordance with the present invention.

A second method in accordance with the present invention, referring now to FIG. 2, may also be employed. Of particular importance in this method, as in the method just described, is the preparation of biased strips or segments of material suitable for building up the desired structure. In step I, in the method according to the steps set out in FIG. 2, a fiber cloth may be segmented at an angle relative to the weave of the cloth. Partial densification and uniformity may be achieved, in step II, by cold pressing together a number of segments in layers to provide relatively thick pieces of material.

These relatively thick pieces of material may be built up into a desired configuration about a central form or, preferably, in a mold. The structure within the mold may be compressed to final densification (step IV), and then the resin may be cured to its final stage (step V). Thereafter, the structure upon removal from the mold may be machined (step VI) to the final desired dimensions.

No matter which method is followed, the increased speed, superior densification and greater uniformity which are desired may be achieved. Various modifications may be made, as set out more fully below. It will also be understood that while the steps described are referred to as being the principal steps to be followed in the method, some steps, such as the final machining, may be omitted entirely and others, such as the final densification and curing, may be combined.

Machines for fabricating temperature and ablation resistant structures, as are indicated generally by the cylinder shown in FIG. 3, may in one form be disposed as shown in the arrangements of FIGS. 4, 6, 7, 8 and 9. Such machines may use a frame structure 10, indicated only generally, including a longitudinal bed 12 (also indicated generally) including ways 13 and 14 extending along the length of the frame 10 and running substantially parallel to the central working axis of the structure.

A motor 16 mounted on a first end of the frame structure 10 above the ways 13 and 14 rotates a chuck 17 which is aligned with a centering device 18 at the tailstock or second end of the structure. The axis between the motor 16, the chuck 17 and the centering device 18, which is also the axis of rotation of the motor 16, will be referred to as the central working axis of the device.

The motor 16 is also coupled to drive a lead screw 20 extending parallel to the central axis and adjacent to one of the ways 13. The drive coupling 21, indicated generally, mechanically drives the lead screw 20 at a rate proportioned to the rate of rotation of the motor 16 and the chuck 17. A guide shaft 23 extending parallel to and adjacent to the lead screw 20 provides further axial support and reference for a carriage 26 which extends laterally across the longitudinal bed 12. The carriage 26 is operatively coupled to the lead screw 20 and the guide shaft 23, and includes grooves 27 in slidable engagement with the ways 13 and 14 of the longitudinal bed 12. Thus, as the motor 16 rotates, the carriage mechanism 26 moves axially along the longitudinal bed 12 parallel to the central axis. The carriage 26 includes a cross slide 28, best seen in the views of FIG. 4 and FIG. 7, the cross slide 28 also including ways 29 which are transverse to the central axis.

A rotatable central form, such as a mandrel 30 is positioned along the central axis between the chuck 17 and the centering device 18 at the different ends of the longitudinal bed 12. The mandrel 30, best seen in FIGS. 4 and 13, may include at the first end a lay-up portion or ring 31 which is held by the chuck 17. The angle of inclination of the lay-up ring 31 relative to the central axis may be selected to provide a reference surface at the first end of the device. From the reference surface a laminated structure 33 may be built up in which the layers have the desired direction of lamination. The direction of inclination of the lay-up ring 31, and the configuration of the mandrel 30 itself, may be widely varied. Thus, the mandrel 30 may be in the form of a truncated cone or other shape having a non-uniform cross-section.

Figure 4:
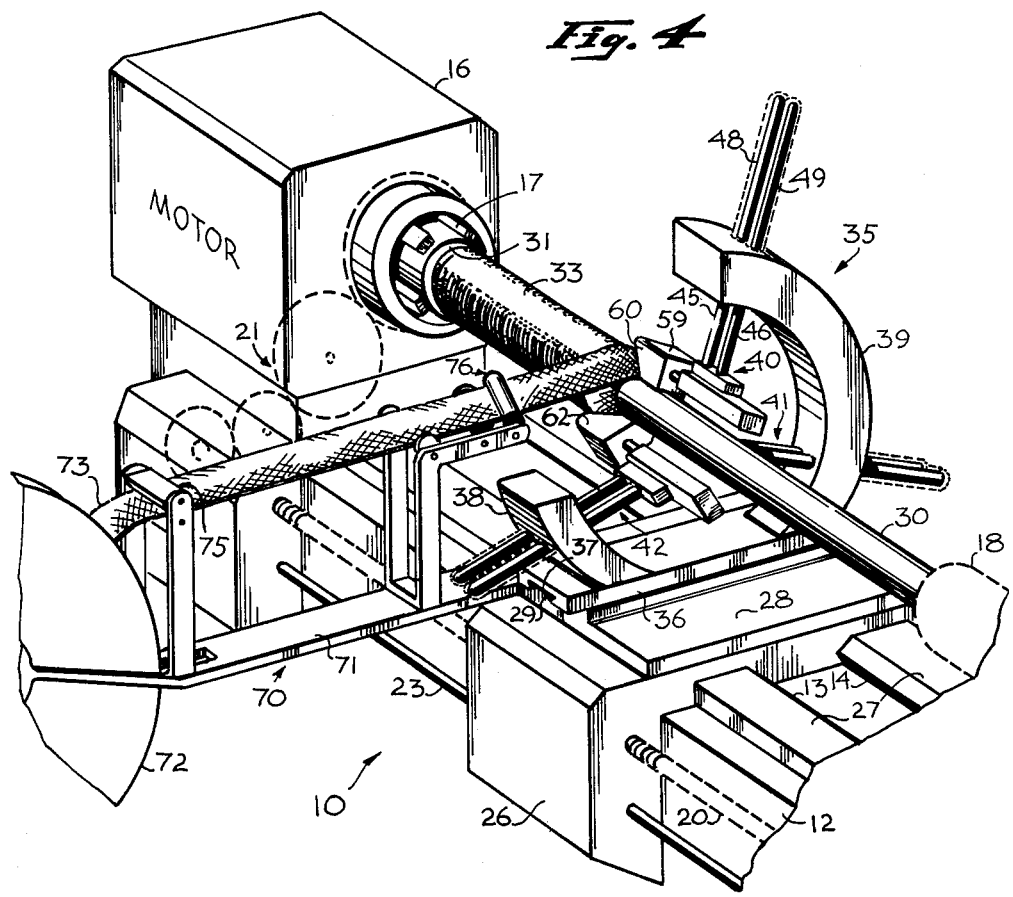
FIG. 4 is a perspective simplified view of a machine for fabricating a fiber reinforced structure having selected internal fiber dispositions in accordance with the present invention.

In conjunction with this mechanism there may be employed a pressure device 35, best seen in FIG. 4 and the detailed fragmentary views of FIGS. 6, 7, 8 and 9.

The pressure device 35 includes a base 36 extending transverse to the longitudinal axis and including grooves 37 in slidable engagement with the ways 29 of the cross slide 28 on the carriage 26. A pair of arcuate support elements 38, 39 partialy encompassing the mandrel 30, are coupled to the base 36 and lie in a plane transverse to the central axis.

A group of three pressure devices 40, 41 and 42, best seen in FIGS. 4, 6 and 8, are circumferentially spaced about the central axis and mounted in the arcuate support elements 38, 39. Inasmuch as the three pressure mechanisms 40, 41 and 42 are substantially alike, only the first mechanism 40 of the group need be described in detail.

The first pressure mechanism 40 includes a pair of radial rods 45, 46, extending radially inwardly toward the central axis and lying in a plane normal to the central axis. Each of the radial rods 45, 46 is journalled in the associated arcuate support, 39, and is urged inwardly toward the central axis by a compression spring 48, 49, coupled between the outer periphery of the support element 39 and the outermost end of the radial rods 45, 46. The ends of the radial rods 45, 46 which are closest to the mandrel 30 are mounted fixedly to a block 50, in which is supported a pair of axial rods 52, 53 extending from the block 50 in the direction toward the first end of the longitudinal bed 12. The axial rods 52, 53 slide within bores 55, 56 (best seen in FIG. 9) in the block 50, and are urged toward the first end of the longitudinal bed 12 by springs 57, 58 within the block 50. A bracket 59 is coupled to the extending free end of the axial rods 52, 53. The pair of rods 45, 46 hold the block 50 in a precise attitude relative to the mandrel 30, and prevent slippage or turning.

Pressure pads 60, 61 and 62 are mounted on the brackets 59 on each of the pressure mechanisms 40, 41, 42. The pressure pads 60, 61, 62 may be metal, Teflon or some other relatively low friction surface material, and in the present instance it is preferred to employ metal pressure pads 60, 61, 62. As illustrated by a first of the pressure pads 60, each is shaped to have a circumferential surface 64 which registers with the mandrel 30 surface, and an axial surface 65 on the side toward the first end of the longitudinal bed 12 which has a selected angle, corresponding to that of the lay-up ring portion of the mandrel 30.

Figure 5:
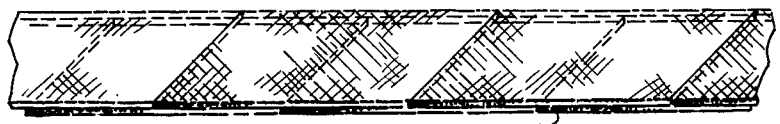
FIG. 5 is a fragmentary perspective view of segments of fiber glass cloth as they may be employed in the arrangement of FIG. 4.

With this arrangement is also employed a cloth feed mechanism 70 (best seen in FIG. 4) mounted on an arm 71 coupled to and movable with the carriage 26. A feed reel 72 is mounted on an outer part of the arm 71, spaced apart from the mandrel 30 and the pressure device 35. The feed reel 72 supplies a lengthy, effectively continuous strip 73 of fiber cloth which in the present example is preferably of the form shown in FIG. 5. Referring to FIG. 5, the strip 73 may be seen to be made up of two layers of biased cloth, made up of individual segments which are cut on a diagonal relative to the weave of the cloth. The individual segments in each layer are laid end to end, but the segments of the different layers overlap. When these two layers are cold pressed in the manner previously described, the layers adhere to each other, although the material is drapable and to a considerable extent stretchable and otherwise deformable. The strip 73 is essentially a continuous strip of double thickness. A continuous strip of overlapping segments is preferably employed where low resin percentages preclude adhesion under cold pressing.

The cloth feed mechanism 70 also includes a pair of guide elements 75, 76 mounted on supports coupled to the arm 71 and spaced at successive points along the path of the strip 73 between the feed reel 72 and the mandrel 30. A first of the guide elements 75 maintains the strip in the desired path, while a second of the guide elements 76 continues the strip 73 along the path, but introduces a partial twist, so that the strip 73 approaches the mandrel 30 edgewise. Each of the guide elements 75, 76 defines an opening through which the strip 73 is to move, and tapered exit and entry surfaces for the strip 73.

In the operation of the arrangement of FIGS. 4, 6, 7, 8 and 9 a strip material 73 is employed which is of a known thickness. When wound upon the mandrel 30, this known average thickness would provide, for a selected speed of rotation of the mandrel 30, a given rate of build up axially along the mandrel 30. The rate of axial movement of the carriage 26, however, is selected to be slower than this average build up rate, so that partial densification is achieved.

Before beginning operation, the leading end of the strip 73 of FIG. 5 is fed from the feed reel 72 onto the feed mechanism through the Teflon guides 75, 76 and between the first pressure pad 60 (FIG. 6) and the lay-up ring 31 of the mandrel 30. This leading end of the strip material 73 may be fixed or temporarily joined to the lay-up ring 31, so as to withdraw material from the feed reel 72 as the mandrel 30 begins to rotate.

Initially, therefore, the direction of lamination is established by the lay-up ring 31. Thereafter, as the mandrel 30 rotates, ring laminations are formed relative to the central axis as turns of strip material 73 are continually added edgewise to and circumferentially about the mandrel 30. The direction of lamination is maintained constant by the lay-up ring and also by the angle of inclination of the pressure pads 60, 61, 62, against which the turn of strip which is being added on to the wound structure 33 continually moves.

The axial and radial pressures exerted on the pressure pads 60, 61, 62 by the radial rods 45, 46 and axial rods 52, 53 and their associated springs 48, 49 and 57, 58 respectively, are important in getting the desired degree of compaction and uniformity in the finally wound structure. The radial pressure maintains the pressure pads 60, 61, 62 against the mandrel 30, so that any tendency of the strip material 73 to lay down on the mandrel 30 is minimized. In addition, because of the angles of inclination of the pressure pad 60, 61, 62 surfaces which bear against the turn of strip material 73, and because of the fact that the turns already on the mandrel 30 are under compaction, uniformity in the direction of laminations is insured.

While under normal circumstances a partially cured resin coating on a fiber cloth has a tendency to spring back or "recover," after cold pressing, it has been found that the use of a number of pressure points about the periphery of the turns, together with the maintenance of constant pressure, keeps the tendency to recover at a minimum and additionally materially aids in the densification of the structure. The use of the carriage mechanism 26, which moves at a rate to cause densification, together with the resiliently mounted pressure pads 60, 61, 62 satisfactorily overcomes variations due to non-uniform tape properties. Both the dimensions and the density of the structure remain substantially constant throughout the entire length.

After a structure 33 of sufficient length has been provided, it may be removed with the mandrel and further densified and solidified, in accordance with the process as previously described. This technique for fabricating the structure proceeds substantially automatically, and extremely rapidly. There is a minimum wastage of the materials employed and particular convenience at each stage of handling.

The feed mechanism 70 may alternatively be constituted of only two pressure mechanisms 41, 42 and a strip feed guide 80 which is coupled to and movable with the carriage 26, as may be seen in FIGS. 10 and 11. The strip feed guide 80 diverts the direction of the strip 73 from an edgewise tangential path about the mandrel 30. The strip feed guide 80 also diverts the strip 73 between the lay-up ring 31 on the mandrel 30 (or previously wound turns) and the remaining pressure pads 61, 62. The strip feed guide 80 (best seen in the reversed view of FIG. 11) includes a principally closed channel portion 81 which is tangential to the surface of the mandrel 30 and which includes internal grooves 82 for receiving and restraining the strip material 73. The strip feed guide 80 terminates relative to the mandrel 30 in a curved guide section 84 which curves about the mandrel 30 into a path concentric with the mandrel 30. The curved guide section 84 includes an outer flange 85 which serves to guide and constrain the strip material 73.

The arrangement of FIGS. 10 and 11 employs the strip feed guide 80 partially for control of the strip 73 motion and partially for some densification of the product. It may be seen that a positive control over the position of the strip material 73 is maintained within the closed channel part 81 as the strip material 73 passes through the grooves 82 therein. Within the open channel section 84, in which a strip material 73 is slightly distorted into an edgewise curved configuration on the mandrel 30 the flat side of the curved guide section 84 bears axially against the strip material 73 to prevent the strip material from sliding down on the mandrel 30. At the same time, however, any tendency of the strip material 73 to slide radially outward or to be distorted outwardly excessively is counteracted by the presence of the curved outer flange 85, within which the strip material 73 is contained.

Figure 13:
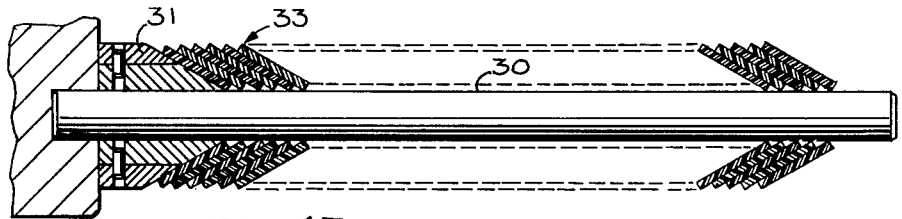
FIG. 13 is a side sectional view of a mandrel and lay-up element which may be employed in the arrangement of FIG. 4, showing in addition the direction of lamination of cloth layers built up thereupon.

No matter which feed arrangement is used, the ring laminated structure 33 which is built up results, as may be seen in FIG. 13, in the direction of laminations remaining substantially constant throughout the entire length of the structure. It should be noted that the width of the individual strips have been enlarged in FIG. 13 for simplicity of representation.

Another form of guide device which may be used in accordance with the invention is illustrated in FIG. 12, in which a single guide 90 serves both to control the form of the path of the strip material about the mandrel (not shown), and to maintain the axial compression which is desired. Although the remaining elements of the machine may be the same, and are therefore not illustrated in FIG. 12, the guide device 90 itself may encompass the mandrel in the form of a partially opened pressure ring 91 having a receiving channel 92 through which the strip material (not shown) passes. The ring 91 may be mounted about and in direct proximity to the mandrel, in the manner of the guide 80 of FIGS. 10 and 11, and has a facing surface 93 adjacent the turns of strip which provides a gradual curvature from the receiving channel 92 to the final angle of inclination which is desired for the direction of laminations. The pressure ring 91 is mounted upon the carriage and moves axially therewith to provide controlled densification in the manner above described. It will be recognized that springs or other mechanical pressure means may also be employed if desired to increase or control the axial compression.

Figure 14:
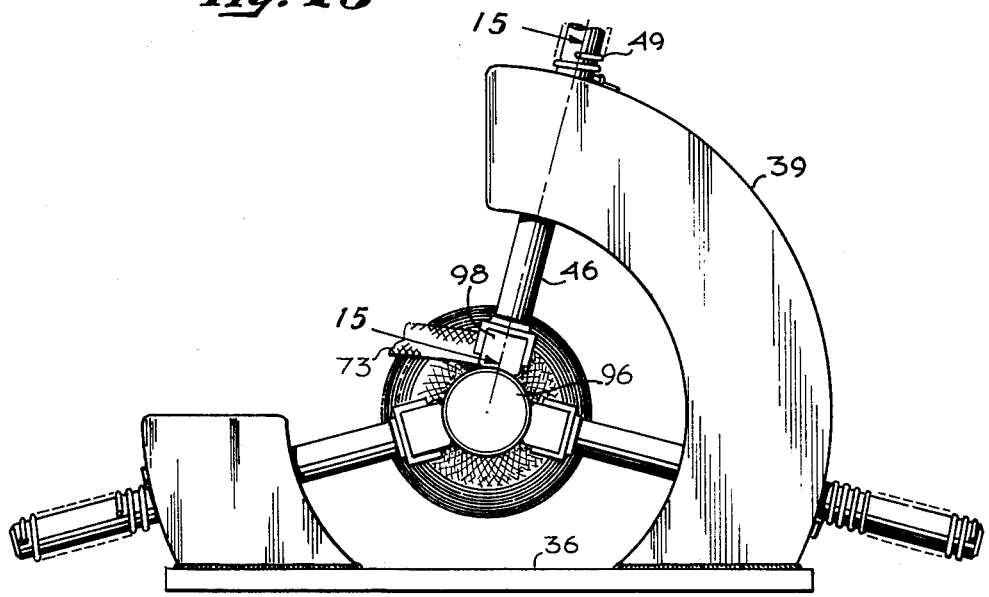
FIG. 14 is an end view of an alternative arrangement of mandrel and pressure elements which may be employed in the general structure of FIG. 4.
Figure 15:
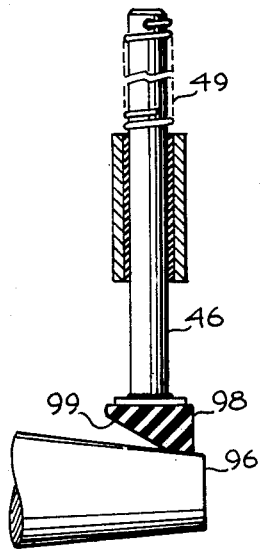
FIG. 15 is a sectional view, taken along the line 15—15 of FIG. 14 and looking in the direction of the appended arrows, of the pressure element of FIG. 14 as used in conjunction with a mandrel of non-uniform cross-sectional configuration.

The use of a ring and pressure structure 90 of the form of FIG. 13, or the combined strip feed guide 80 and pressure pads of the form of FIGS. 10 and 11 would not be suitable, without further modification, for use where the inner configuration desired for the structure being wound is of a non-uniform cross-sectional shape. Thus, it may be desired to provide a hollow wound structure in which the inner configuration is that of a truncated cone, as shown by the mandrel of FIGS. 14 and 15. With this arrangement, it may also be desired to employ directions of laminations which are markedly inclined relative to the central axis. The greater the angle of inclination, and the more parallel the laminations to the central axis, the more densification is achieved by radial rather than by axial compression. Accordingly, a machine may be constructed having elements similar to those of FIG. 4, except for the pressure device 95 illustrated in FIGS. 14 and 15, used in conjunction with a mandrel 96 of non-uniform cross-section as shown therein. For this purpose, the pressure device may include arcuate support elements 38, 39 and spring biased radial rods 46, but the ends of the axial rods 46 which are closest the mandrel 96 may terminate in pressure pads 98 bearing directly against the surface of the mandrel 96. The pressure pads 98 may have inclined surfaces 99 (FIG. 15) on the side adjacent the first end of the machine, at which the winding begins, with the direction of inclination corresponding to that desired for the wound structure.

It has been found that this arrangement, operated in the manner described above with the carriage moving at a controlled rate relative to the rate of rotation of the mandrel, provides both sufficient compaction and adequate control of the direction of lamination. As the cross-sectional size of the mandrel 96 changes relates to the turns which are being added on, the pressure pads 98 remain in contact with the surface of the mandrel 96 and press the turns on in the desired direction of lamination.

While the use of these machines and methods have been described principally in conjunction with a continuous strip of high silica fiber cloth, it will also be recognized that other materials and other dispositions can be used to obtain a fully wound structure having the desired fiber disposition. Thus, a single layer of strip can be formed by sewing together individual segments, without pressure. A felted mat of fibers may be formed into a tape of selected thickness. Or a tape can be sewn together of woven material, in which the fibers are all disposed normal to the edge of the tape, so that in a wound structure there is a completely end grained orientation. Other alternatives will suggest themselves to those skilled in the art.

It will thus be appreciated that methods and machines have been provided for fabricating structures which have extremely high resistance to temperature and ablation effects. These structures may rapidly be fabricated, but there is a minimum wastage of material involved. The highly desirable end grained orientation, and control of the direction of lamination of the fibers relative to a specific surface are both provided without a need for special equipment. The difficulties heretofore encountered due to variations in the thickness of the material and in its tackiness are largely obviated.

While there have been described above and illustrated in the drawings various machines and methods for fabricating temperature and ablation resistant structures of fiber reinforced materials, it will be appreciated that the invention is not limited thereto. Accordingly, the invention should be considered to encompass all modifications, variations, or equivalent arrangements falling within the scope of the annexed claims.

What is claimed is:

1. The method of fabricating a hollow symmetrical resin impregnated fiber reinforced structure in which the fibers are disposed with selected inclinations to a given surface of the structure which includes the steps of cutting a woven cloth which is coated with a partially cured phenolic resin into individual strips which extend diagonally with respect to the weave of the cloth, forming a continuous double layered strip from the individual strips, pressing the double layered strips together to establish adhesion between the strips, winding the double layered strips helically upon a central form with the strip being maintained edgewise with respect to the form and adjacent flat sides of the strips being together, continually uniformly compressing the wound structure to produce partial densification by uniformly pressing the turn of strip which is being wound upon the form into the remaining windings, fully densifying the structure by uniformly compressing the structure and fully curing the resin of the fully wound structure while on the central form, removing the structure from the central form, and machining the structure to final dimensions.

2. A method of forming fiber reinforced structures in which fibers lie in selected directions relative to a surface of the structures which includes the steps of cutting a fiber cloth into segments the lengths of which lie in selected directions other than normal relative to the weave of the cloth, joining the segments together in at least partially overlapping relation into a continuous strip, building up the strip while maintaining the strip under uniform compression for partial densification thereof throughout the winding so as to form a desired structural configuration with the strip lying at least partially edgewise, and compressing the structure thus formed to a final density of at least about one hundred pounds per cubic foot.

3. The method of forming extremely high temperature and ablation resistant structures having the form of relatively thick walled surfaces of revolution and consisting of resin impregnated silica fiber reinforced structures with the silica fibers having at least a partially end grain orientation with respect to the surface of revolution, the method including the steps of cutting silica fiber fabrics which are coated with B stage phenolic resin on a diagonal relative to the silica fibers into elongated strips, winding the strips helically upon a central form at a uniform axial rate, the strips being edgewise to the central form with the flat sides being together at a selected angle relative to the axis of the central form, thus to build up a ring laminated structure, partially densifying the ring laminated structure as it is built up by concurrently maintaining a pressure on the flat sides of the strips as they are added on, the pressure being exerted in the direction of the built up structure and at an angle substantially normal to the flat sides of the strips and being maintained uniform throughout the build-up of the structure, further compressing the fully built up structure while on the form to a density of at least about one hundred pounds per cubic foot, curing the resin of the structure to C stage while the structure is on the form, removing the structure from the form, and machining the inner and outer dimensions of the structure to final desired dimensions.

4. The method of forming a resin impregnated silica fiber reinforced structure with the silica fibers having a selected angular relation relative to particular surfaces of the structure including the steps of cutting a resin coated silica fiber fabric on a bias into elongated strips, the resin coating being partially cured, winding the biased cut strips helically at a uniform axial rate upon a central form to build up a thick walled structure, the strips being wound edgewise to the central form and having their flat sides together, concurrently maintaining uniform pressure during substantially the entire winding step on the flat sides of the strips being added to the structure as it is built up to partially densify the structure, and completing densification of the structure while fully curing the resin, said densification being effected by uniformly compressing the structure.

5. A machine for forming a structure in the configuration of a surface of revolution consisting of a fiber reinforced structure in which the fibers lie in laminations having a selected angle relative to the central axis of the surface of revolution and in which the fibers have selected radial dispositions relative to the central axis, the machine including in combination a rotatable central form, means for feeding strips of bias-cut cloth material having a partially cured resin coating helically upon the rotatable central form, with the strips being disposed edgewise to the central form, and means disposed along the path of winding of the strips of material and coupled mechanically to the rotatable central form to move axially along the central form at a rate proportional to but less than the rate of build-up of said strip for pressing against the flat side of the turn of strip being added to axially and uniformly compress the structure as the strips are wound upon the rotatable central form.

6. A machine for forming relatively thick walled structures having the form of a surface of revolution about a central axis and consisting of a fiber reinforced resinous body, the fibers in which are disposed in the form of ring laminations having a selected angle to the axis of the surface of revolution, the machine including in combination a rotatable central form having the approximate dimensions desired for the inner surface of the surface of revolution, the central form including a lay-up portion extending at the angle desired for the direction of laminations from the central axis, means for feeding deformable strips of resin coated fibers to the vicinity of the central form, a carriage mechanism movable at a selected controlled rate of speed proportioned to the speed of rotation of the central form but less than the rate of build-up of the strips on the central form and adjacent to the central form, means coupled to the carriage mechanism and coupled to receive the strips for feeding the strips onto the central form to be wound thereabout, and pressure elements coupled to the carriage and movable therewith and extending into the path of the strips which are being laid on to exert a uniform pressure on the strips in a direction substantially normal to the direction of the lamination during the entire build-up of said strips into said body.

7. A machine for fabricating a solid hollow structure extending about an axis, with the structure consisting of ring type laminations of resin coated glass cloth, the fibers at one surface of the body lying at selected end orientations relative to the surface, the machine including the combination of a bed structure, a rotatable mandrel extending along the bed structure and having an outer configuration which is a rough approximation of the inner surface desired for the solid hollow body, the mandrel including a lay-up ring extending in the direction of lamination desired for the ring, means supplying bias cut strips of glass reinforced resin coated fabric material, a carriage mechanism axially movable along the bed, a motor drive coupled to rotate the mandrel, a lead screw mechanism coupled to the motor drive and to the carriage and moving the carriage along the axis at a controlled rate relative to the mandrel rotation but less than the rate of build-up of said strips of said mandrel, strip guiding members mounted on the carriage and movable therewith, the strip guiding members feeding the strip material edgewise to the mandrel such that the solid hollow body is helically built up as the strip material is fed at a controlled axial rate along the mandrel, and pressure elements coupled to the carriage and bearing against the flat surfaces of the strip material as it is helically wound upon the mandrel, the pressure elements acting against the strip material to uniformly compress and maintain uniform compression equally upon the solid hollow structure during the entire build-up thereof.

8. A machine for forming structures in the configuration of surfaces of revolution which consist of fiber reinforced structures in which the fibers lie in laminations at a selected angle relative to the central axis of the surface of revolution, the machine including in combination a rotatable central form, means providing strips of fiber material to be wound into the reinforced structure, a carriage structure movable along the rotatable central form at a controlled rate related to the speed of rotation of the central form, and a strip feed and pressure mechanism coupled to the carriage and movable therewith, the pressure means being adapted to exert uniform pressure on the strips during the entire winding of the strips on the mandrel and including means disposed tangentially to the rotatable central form for receiving the strips of fiber material and disposing the same edgewise and circumferentially about the rotatable central form, the controlled rate of movement of the carriage structure being less than the rate of material buildup on the central form.

9. The invention as set out in claim 8 above, wherein the means disposed tangentially to the rotatable central form comprises a substantially closed channel section and an arcuate terminal open channeled guide section connected thereto and having an outer flange for confining the strips of material into motion about the form, and wherein the pressure mechanism includes pressure elements coupled to the carriage structure and bearing against the strip material about the form at different selected points to uniformly densify the structure during its build-up.

10. The invention as set out in claim 9 above, wherein the arcuate guide section substantially encompasses the rotatable central form and forms a pressure ring, the guide section having an outer flange for restraining the strips and a facing surface for bearing against the strips.

11. A device for the control of the winding of strips of fiber material having a resin coating which includes a form on which the strips are to be wound, guide means for feeding the strips edgewise and tangentially to the form, and a plurality of pressure means disposed at successive points along the path of a turn of strip being added on and adapted to move along the line of build-up of said strip at a controlled rate proportional to but slightly less than the rate of build-up of the strips on the form so as to exert uniform pressure on said strip during the entire build-up of said strip, each of the pressure means maintaining a pressure of less than 800 p.s.i. to cause adjacent turns of the strip to adhere to each other to produce a partially densified structure.

12. A machine for forming structures in the configuration of surfaces of revolution made up of fiber reinforced materials in which the fibers lie in laminations having a selected angle relative to the central axis of the surface of revolution and in which the fibers also have selected radial dispositions relative to the central axis, the machine including in combination a frame structure, a rotatable central form mounted along a central axis on the frame structure, a carriage device mounted on the frame structure and movable parallel to the central axis adjacent the rotatable central form, means coupling the rotatable central form to the carriage device to move the carriage device axially along the central form at a rate proportional to the rate of rotation of the central form, a feed reel coupled to the carriage device and movable therewith, the feed reel providing strips of bias-cut cloth material which is coated with a partially cured resin, guide means mounted on and movable with the carriage between the feed reel and the central form and positioned to guide the strips to a tangential position relative to the central form in which the strips are edgewise relative to the central form, such that the strips are helically wound upon the central form as the central form rotates, a pressure device coupled to the carriage and at least partially encompassing the central form, and including pressure pads bearing against the central form at different peripheral points therearound and against the turn of strip which is being added on, and spring elements for urging the pressure pads against the turn of strip which is being added on to the structure being wound, the pressure exerted being sufficient to cause adjacent turns of the strip to adhere due to the resin coating.

13. A machine for forming structures in the configuration of surfaces of revolution including the combination of a frame, a mandrel mounted along a central axis along the frame, the mandrel including a lay-up ring having a surface with a selected angle relative to the axis at a first end thereof, a motor coupled to the mandrel adjacent to a first end thereof for rotating the mandrel at a selected rate, a carriage device mounted on the frame and slidable therealong parallel to the mandrel, a lead screw device extending parallel to the central axis and mechanically coupled to the motor and to the carriage device for moving the carriage device at a selected axial rate proportioned to the rate of rotation of the mandrel, the proportion being selected in accordance with the average rate desired for the addition of material to be formed on the mandrel, a strip feed reel spaced apart from the mandrel and coupled to and movable with the carriage, strip guide means along the path between the feed reel and the mandrel and shaped to divert the strip tangentially into a circumferential path about the mandrel with the strip being disposed edgewise relative to the mandrel, such that the strip can be fed to the lay-up ring at the first end of the mandrel and is thereafter helically wound edgewise upon the mandrel, and a pressure device coupled to the carriage device and operating to maintain a selected pressure against the turn of strip being added on as the wound structure is being built up successively further from the first end of the mandrel, the pressure device including support elements coupled to the carriage and extending at least partly around the mandrel, a number of radial members mounted in the support elements and extending radially inwardly toward the surface of the mandrel, spring means coupled to each of the radial members for tending to maintain the radial members against the mandrel, axial members coupled to the end of the radial members adjacent to the mandrel and coupled to extend substantially parallel to the surface of the mandrel, spring means coupled to the axial members to urge the axial members toward the first end of the mandrel, and a number of pressure pads, each coupled to different ones of the axial members and extending into contact with the turn of strip being added on to the mandrel, the axial movement of the pressure pads with the carriage and the biasing effect of the associated spring means acting to maintain a pressure on the strip which is substantially uniform along the entire length of the structure being wound and which is sufficient to cause adjacent turns of the strip to adhere and the structure to be partially densified.

References Cited in the file of this patent

UNITED STATES PATENTS

| | | |
|---|---|---|
| 1,151,096 | French | Aug. 24, 1915 |
| 1,622,048 | Pierson | Mar. 22, 1927 |
| 1,670,061 | Carroll | May 15, 1928 |
| 2,236,901 | Hall | Apr. 1, 1941 |
| 2,380,111 | Kasten | July 10, 1945 |
| 2,726,978 | Skinner | Dec. 13, 1955 |
| 2,950,152 | Garceau | Aug. 23, 1960 |

UNITED STATES PATENT OFFICE
CERTIFICATE OF CORRECTION

Patent No. 3,140,968                  July 14, 1964

Hector R. Barrios et al.

It is hereby certified that error appears in the above numbered patent requiring correction and that the said Letters Patent should read as corrected below.

Column 1, line 32, for "having" read -- have --; line 46, after "gases" insert a comma; lines 47 and 48, strike out "tends to peel off and the erosion due to ablation"; same column 1, line 51, strike out "are", second occurrence; column 12, line 23, for "lamination" read -- laminations --; line 42, for "of", third occurrence, read -- on --.

Signed and sealed this 30th day of March 1965.

(SEAL)
Attest:

ERNEST W. SWIDER
Attesting Officer

EDWARD J. BRENNER
Commissioner of Patents